United States Patent
Kobori

(10) Patent No.: US 9,415,453 B2
(45) Date of Patent: Aug. 16, 2016

(54) RECIPROCATING TOOL

(75) Inventor: Kenji Kobori, Ibaraki (JP)

(73) Assignee: HITACHI KOKI CO., LTD., Tokyo (JP)

(*) Notice: Subject to any disclaimer, the term of this patent is extended or adjusted under 35 U.S.C. 154(b) by 45 days.

(21) Appl. No.: 14/130,486

(22) PCT Filed: Aug. 27, 2012

(86) PCT No.: PCT/JP2012/072279
§ 371 (c)(1),
(2), (4) Date: Dec. 31, 2013

(87) PCT Pub. No.: WO2013/038930
PCT Pub. Date: Mar. 21, 2013

(65) Prior Publication Data
US 2015/0033564 A1 Feb. 5, 2015

(30) Foreign Application Priority Data
Sep. 15, 2011 (JP) ................. 2011-201552

(51) Int. Cl.
*B23D 51/16* (2006.01)
*B25F 5/00* (2006.01)

(52) U.S. Cl.
CPC ............ *B23D 51/16* (2013.01); *B25F 5/006* (2013.01)

(58) Field of Classification Search
CPC ................................. B23D 51/16; B25F 5/006
USPC .................................... 30/392–394
See application file for complete search history.

(56) References Cited

U.S. PATENT DOCUMENTS

| 2,749,758 | A |   | 6/1956 | Emrick |
|---|---|---|---|---|
| 3,404,574 | A | * | 10/1968 | Stelljes .......................... 74/50 |
| 3,513,544 | A |   | 5/1970 | Renger |
| 5,099,705 | A | * | 3/1992 | Dravnieks ..................... 74/50 |
| 5,127,279 | A | * | 7/1992 | Barthruff ........................ 74/6 |
| 7,363,713 | B2 | * | 4/2008 | Hirabayashi et al. ......... 30/392 |
| 2001/0034941 | A1 |   | 11/2001 | Bednar et al. |

(Continued)

FOREIGN PATENT DOCUMENTS

| CN | 1481288 A | 3/2004 |
|---|---|---|
| CN | 1496772 A | 5/2004 |

(Continued)

OTHER PUBLICATIONS

Chinese Office Action for the related Chinese Patent Application No. 2012800383224 dated Apr. 27, 2015.

(Continued)

*Primary Examiner* — Hwei C Payer
(74) *Attorney, Agent, or Firm* — Kenealy Vaidya LLP

(57) ABSTRACT

To provide a reciprocating tool capable of reducing noise by a simple and inexpensive configuration.
In a reciprocating tool including a motor that is a rotary drive source, and a reciprocating motion converter that converts the rotation of the motor into the reciprocation of a tip tool, the reciprocating motion converter includes an eccentric rotation member that eccentrically rotates, a reciprocating member that is engaged with the eccentric rotation member and reciprocates, and an elastic member provided between the eccentric rotation member and the reciprocating member. Inside the reciprocating member, an intermediate member is provided, and the elastic member is interposed between the intermediate member and the reciprocating member.

9 Claims, 6 Drawing Sheets

(56) References Cited

U.S. PATENT DOCUMENTS

| | | |
|---|---|---|
| 2004/0040161 A1 | 3/2004 | Houben et al. |
| 2004/0117993 A1 | 6/2004 | Armstrong |
| 2005/0016001 A1 | 1/2005 | Griep et al. |
| 2005/0132583 A1 | 6/2005 | Bednar et al. |
| 2008/0029282 A1 | 2/2008 | Ikuta |
| 2008/0189963 A1* | 8/2008 | Griep et al. .................. 30/394 |
| 2009/0113728 A1 | 5/2009 | Oki et al. |
| 2010/0180455 A1 | 7/2010 | Haas |

FOREIGN PATENT DOCUMENTS

| | | |
|---|---|---|
| CN | 1605439 A | 4/2005 |
| CN | 101596621 A | 12/2009 |
| DE | 3437804 A1 | 7/1985 |
| DE | 19937560 A1 | 2/2000 |
| DE | 102008002212 A1 | 12/2009 |
| EP | 2 444 206 A1 * | 4/2012 |
| GB | 2 152 618 A | 8/1985 |
| GB | 2403181 A | 12/2004 |
| JP | 2006-175524 A | 7/2006 |

OTHER PUBLICATIONS

International Search Report for PCT Patent App. No. PCT/JP2012/072279 (Dec. 20, 2012).

* cited by examiner

RECIPROCATING TOOL

This application is a U.S. national phase filing under 35 U.S.C. §371 of PCT Application No. PCT/JP2012/072279, filed Aug. 27, 2012, and which in turn claims priority under 35 U.S.C. §119 Japanese Patent Application No. 2011-201552 filed Sep. 15, 2011, the entireties of which are incorporated by reference herein.

TECHNICAL FIELD

The present invention relates to a reciprocating tool which converts a rotation of a motor or the like into reciprocation of a tip tool and performs work such as cutting.

BACKGROUND ART

There have been widely used reciprocating tools which move tip tools in reciprocation directions and perform work such as cutting. As examples of these reciprocating tools, jigsaws are known. A tool for converting a rotation of a motor or the like into a reciprocation of a tip tool according to the related art will be described on a basis of an example of the jigsaws and with reference to FIG. 7.

FIG. 7 is a partial cross-sectional view of a jigsaw 101 according to the related art. The jigsaw 101 includes a motor (not shown), which is accommodated in a housing 115, and a pinion 113 that is provided to an output shaft 109 of the motor. The pinion 113 is engaged with a gear 107 which is provided with an eccentric cam 107a that is configured to make a balance weight 108 reciprocate. Also, an eccentric pin 111, which is configured to make a plunger 112 reciprocate, is provided to the gear 107. A reciprocating motion converter is used to convert the rotation of a rotary drive source (e.g., the motor) into the reciprocation of the plunger 112, so as to cut a workpiece with a blade 114 attached to the lower end side of the plunger 112. Also, according to the reciprocation of the plunger 112, the balance weight 108 reciprocates in the opposite phase to that of the plunger 112, thereby compensating for vibration attributable to the reciprocation of the plunger 112. As this jigsaw 101, a technology disclosed in PTL 1 is known. In this related-art technology, an elastic member 121 is interposed between a gear holder 105 (a part of the reciprocating motion converter) and a housing 115, so as to reduce transfer of vibration occurring at a blade 114 to a housing 115.

CITATION LIST

Patent Literature

PTL 1: JP-A-2006-175524

SUMMARY OF INVENTION

Technical Problem

In the jigsaw of PTL 1, it may be possible to effectively reduce transfer of the vibration to the housing 115. However, the inventor of the present invention found out by studies that, in order to further reduce the vibration, the following problems should be solved. For example, at the top dead center and bottom dead center of the reciprocation, the eccentric cam 107a and the balance weight 108 collide with each other due to a minute gap between the eccentric cam 107a provided to the gear 107 and the balance weight 108, whereby a little noise occurs from their surfaces. Further, since the gear holder 105 can be displaced with respect to the housing 115 due to the effect of the elastic member 121 interposed between the gear holder 105 and the housing 115 having a handle portion to be grasped by a worker, depending on the elastic member 121, during cutting, the transverse vibration of the blade may increase and influence an accuracy of cutting.

The present invention was made in view of the above-described background, and one object of the present invention is to provide a reciprocating tool with further reduced noise.

Another object of the present invention is to provide a user-friendly reciprocating tool which reduces the vibration of a main body attributable to the reciprocation of a blade.

Still another object of the present invention is to provide a reciprocating tool having durability improved by improving the life of an elastic member when the elastic member is provided to reduce the vibration or impact of a reciprocating motion converter.

Solution to Problem

The representative features of inventions to be disclosed in this specification are as follow.

According to a first illustrative aspect of the present invention, there is provided a reciprocating tool comprising: a rotary drive source; and a reciprocating motion converter configured to convert a rotation of the rotary drive source into a reciprocation of a tip tool, wherein: the reciprocating motion converter comprises: an eccentric rotation member configured to eccentrically rotates; a reciprocating member, which is engaged with the eccentric rotation member, and which is configured reciprocate; and an elastic member provided between the eccentric rotation member and the reciprocating member. According to a second illustrative aspect of the present invention, an intermediate member is disposed between the eccentric rotation member and the reciprocating member; and the elastic member is disposed between the reciprocating member and the intermediate member. According to a third illustrative aspect of the present invention, a deformation restricting portion for preventing excessively large deformation of the elastic member is provided to at least one of the intermediate member and the reciprocating member. According to a fourth illustrative aspect of the present invention, the elastic member is a rubber member; the deformation restricting portion is a recess formed at any one of facing surfaces of the intermediate member and the reciprocating member; and the elastic member is disposed in the recess. According to a fifth illustrative aspect of the present invention, the elastic member has elasticity in a movement direction of the reciprocating member.

According to a sixth illustrative aspect of the present invention, the eccentric rotation member is an eccentric cam, which outer periphery has a circular shape, and which has a rotary shaft at a position offset from a center of the circular shape; the reciprocating member has an opening and comprises a balance weight configured to move in a direction perpendicular to the direction of the rotary shaft of the eccentric rotation member; the intermediate member has an opening and is disposed in the opening of the reciprocating member; and the eccentric cam is configured to rotate while coming into contact with the inner portion of the opening of the intermediate member, so as to reciprocate the balance weight. According to a seventh illustrative aspect of the present invention, the elastic member is provided between the intermediate member and the balance weight.

According to an eighth illustrative aspect of the present invention, the eccentric rotation member comprises a sleeve that is rotatably supported by a spindle fixed at a position offset from the rotary shaft; the reciprocating member comprises a plunger that is reciprocally supported by the sleeve and is configured to fix the tip tool; and the elastic member is provided between the sleeve and the plunger. According to a ninth illustrative aspect of the present invention, the reciprocating member comprises a connector configured to move the plunger; and the elastic member is provided between the sleeve and the connector. According to a tenth illustrative aspect of the present invention, the elastic member is an O ring made of rubber; and the O ring is provided in a recess formed at a surface which is an outer periphery of the sleeve and is slidably fit with the connector.

Advantageous Effects of Invention

According to the first illustrative aspect, the reciprocating motion converter includes an eccentric rotation member that eccentrically rotates, a reciprocating member that is engaged with the eccentric rotation member and reciprocates, and an elastic member provided between the eccentric rotation member and the reciprocating member. Therefore, it is possible to reduce vibration or noise attributable to contact with the eccentric rotation member when the movement direction of the reciprocating member is reversed.

According to the second illustrative aspect, the eccentric rotation member and the intermediate member come into contact with each other, so that the eccentric rotation member does not come into contact with the elastic member. Therefore, it is possible to prevent wearing of the elastic member and to increase the life.

According to the third illustrative aspect, the deformation restricting portion for preventing excessively large deformation of the elastic member is provided to at least one of the intermediate member ad the reciprocating member. Therefore, it is possible to prevent excessive deformation of the elastic member, and to increase the life of the reciprocating tool.

According to the fourth illustrative aspect, the deformation restricting portion is formed by a recess. Therefore, processing of the recess is relatively easy, and it is possible to surely hold the position of the elastic member by the recess and to reliably prevent excessive deformation.

According to the fifth illustrative aspect, it is possible to reduce vibration or noise attributable to contact with the eccentric rotation member when the reciprocation direction of the reciprocating member is reversed.

According to the sixth illustrative aspect, the eccentric cam rotates to come into contact with the intermediate member provided in the opening of the balance weight. Therefore, it is unnecessary to provide the elastic member on the sliding surfaces of the intermediate member and the eccentric cam, and it is possible to provide the elastic member between the intermediate member and the balance weight which is a non-rotation member.

According to the seventh illustrative aspect, the elastic member is provided between the intermediate member and the balance weight. Therefore, it is possible to provide the elastic member between non-rotation members, and to prevent the elastic member from being worn out due to friction.

According to the eighth and ninth illustrative aspects, the elastic member is provided between the sleeve and the plunger, specifically, between the sleeve and the connector. Therefore, it is possible to effectively reduce vibration or noise occurring at the contact portion of the sleeve and the connector.

According to the tenth illustrative aspect, as the elastic member, the O ring is provided in the recess at the outer periphery of the sleeve. Therefore, it is possible to use a general-purpose O ring, and to suppress an increase in the manufacturing cost.

The above and other objects and new features of the present invention will become apparent from the following description of this specification and the drawings.

BEST MODE FOR CARRYING OUT THE INVENTION

First Embodiment

Figure 1:
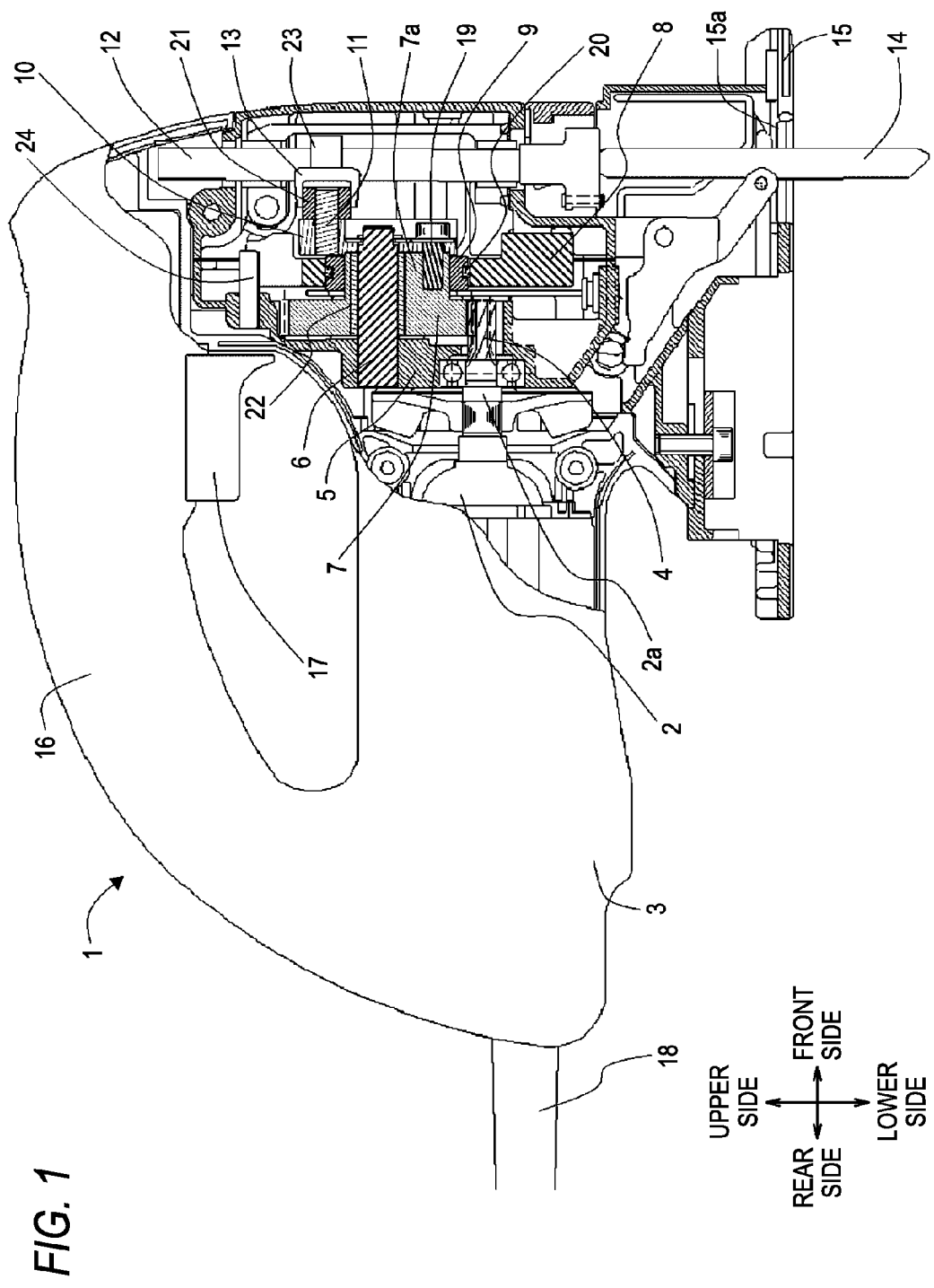
FIG. 1 is a side view illustrating the shape of the whole of a reciprocating tool 1 according to an embodiment of the present invention, with a cross-section of a part of the reciprocating tool 1.

Hereinafter, embodiments of the present invention will be described with reference to the accompanying drawings. In the present embodiment, a jigsaw will be described as an example of a reciprocating tool 1. In this specification, a front side, a rear side, an upper side, and a lower side will be described with reference to directions shown in FIG. 1. FIG. 1 is a side view illustrating the shape of the whole of a reciprocating tool 1 according to a first embodiment, with a cross-section of a part of the reciprocating tool 1.

The reciprocating tool 1 is an electric tool for rotating a motor 2, which is accommodated in a housing 3, by commercial power supplied through a power supply cord 18, such that a plunger 12 reciprocates in a predetermined direction (e.g., in a vertical direction in the state of FIG. 1) by virtue of the toque of the motor 2, whereby a blade 14 attached to an end of the plunger 12 (the lower end in the state of FIG. 1) reciprocates. A tool as shown in FIG. 1 is called a jigsaw. The motor 2 is a rotary drive source such as an AC motor. The motor 2 is disposed such that its output shaft (e.g., rotary shaft) 2a extends in an anteroposterior direction. At the front end of the output shaft 2a, a pinion 4 is provided. At the upper side of the housing 3, a handle portion 16 for enabling a worker to hold thereof is provided. On the lower side of the front side of the handle portion 16, a trigger switch 17 is provided. When the worker pulls the trigger switch 17, power according to the amount of pulling on the trigger switch 17 is supplied to the motor 2, such that the motor 2 rotates. As a result, the pinion 4 rotates.

On the pinion 4, a gear 7 is positioned. The gear 7 is engaged with the pinion 4. The gear 7 is held to be rotatable by a spindle 6 disposed in parallel with the output shaft 2a. The rear of the spindle 6 is held by a gear holder 5. On the front side of the gear 7, an eccentric cam 7a is provided as an eccentric rotation member. In the present embodiment, the gear 7 and the eccentric cam 7a are formed as one member. However, they may be formed separately. When the gear 7 rotates, the eccentric cam 7a eccentrically rotates on the spindle 6 such that its outermost circumference positions follow different tracks. The balance weight 8, which is one example of a reciprocating member, is supported by the gear holder 5 such that the balance weight 8 can reciprocate in the vertical direction along a guide pin 24 fixed to the gear holder 5. The balance weight 8 has an opening 8a (which will be described later) formed in the vicinity of its center in the vertical direction, and the eccentric cam 7a is positioned in the opening 8a. In a case of the present embodiment, according to the rotation of the eccentric cam 7a, the balance weight 8 vertically reciprocates on a straight line perpendicular to the axis line of the eccentric cam 7a.

An elastic member is provided between the balance weight 8 and the eccentric cam 7a. For example, in the embodiment shown in FIG. 1, an intermediate member 9 is interposed between the balance weight 8 and the eccentric cam 7a, and a rubber ring 20, which is one example of an elastic member, is disposed between the intermediate member 9 and the balance weight 8. The intermediate member 9 includes an interlocking portion 9a having a substantially oval shape, and the interlocking portion 9a is disposed to accommodate the eccentric cam 7a. Incidentally, the gear 7, the balance weight 8, and the intermediate member 9 are made of metal materials. However, the gear 7, the balance weight 8, and the intermediate member 9 may be made of any other wear-resistant and lubricant materials, carbon, etc. A variation in the eccentricity of the eccentric cam 7a from the spindle 6 becomes the amount of reciprocation of the balance weight 8.

At the front side of a main body of the gear 7, a weight holder 10 for holding the balance weight 8 is fixed by a bolt 19. The weight holder 10 is a member which rotates together with the gear 7. A pin 11 is pressed into the weight holder 10 from the front side so as to hold the sleeve 21 to be rotatable on the weight holder 10.

Inside the housing 3, in the vicinity of the front end portion thereof, the plunger 12 is disposed on the front side of the eccentric cam 7a. The plunger 12 is supported to be able to reciprocate vertically to the housing 3. At a part of the plunger 12, the connector 13 having a U-shaped section in a side view (the state seen as FIG. 1) is firmly fixed through a holder 23. The pin 11 is fitted into the connector 13 through the sleeve 21 such that the pin 11 is slidable. The blade 14 is a tip tool and is detachably attached to the lower end of the plunger 12. The blade 14 passes through an opening 15a of a base 15, which is horizontally attached at the bottom of the housing 3, and extends almost vertically down from the base 15. In the present embodiment, the diameter of the rotational track of the pin 11 relative to the spindle 6 becomes the amount of reciprocation of the plunger 12.

In order to operate the reciprocating tool 1, the worker connects the power supply cord 18 to an external power source (not shown), holds the handle portion 16, and operates the trigger switch 17 to supply power to the motor 2, whereby the motor 2 rotates. The rotation of the motor 2 is decelerated through the pinion 4 and is transferred to the gear 7, such that the gear 7 rotates on the spindle 6. On the front side of the gear 7, the weight holder 10 is fixed. The weight holder 10 rotates on the spindle 6 coaxially with the gear 7. When the pin 11 rotates on the spindle 6 while sliding along the connector 13, the plunger 12 reciprocates vertically, and the blade 14 can cut a workpiece (not shown).

Figure 2:
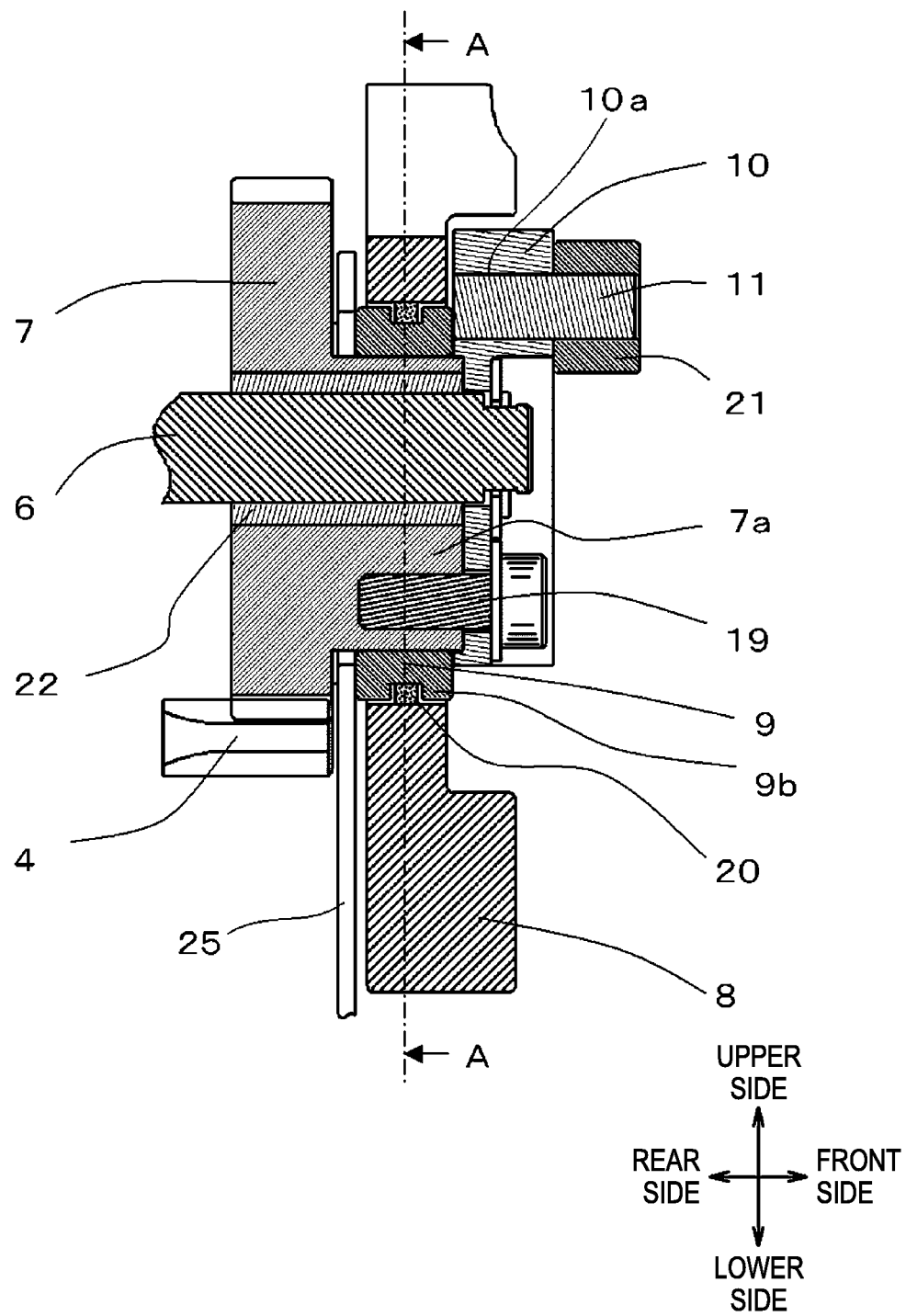
FIG. 2 is an enlarged cross-sectional view illustrating main parts in a vicinity of a balance weight 8 of FIG. 1

FIG. 2 is an enlarged cross-sectional view illustrating main parts in the vicinity of a balance weight 8 of FIG. 1. The balance weight 8 is configured to have a predetermined weight and is configured to move in the opposite phase to that of the reciprocating blade 14 so as to compensate for vibration attributable to the reciprocation. In the individual components shown in FIG. 2, the balance weight 8, the intermediate member 9, and the rubber ring 20 are components which reciprocates vertically, and the pinion 4, the gear 7, the eccentric cam 7a, the weight holder 10, the pin 11, and the bolt 19 are members which rotate on the spindle 6. The spindle 6 neither moves nor rotates. However, on the outer circumference side of the spindle 6, a bearing 22 is provided such that the gear 7 can smoothly rotate. In the present embodiment, the intermediate member 9 is interposed between the balance weight 8 and the eccentric cam 7a and has a recess 9b formed continuously in a circumferential direction at the outer periphery of the intermediate member 9. The rubber ring 20 is fit into the recess 9b. Therefore, frictional resistance according to the rotation of the eccentric cam 7a does not act directly on the rubber ring 20. Also, when the balance weight 8 and the intermediate member 9 reciprocate vertically, even if the rubber ring 20 tries to shift in an axial direction (the anteroposterior direction) and a radial direction (the vertical direction) from the outer periphery of the intermediate member 9, by virtue of the recess 9b, there is no fear that the rubber ring 20 may get out of the place. Therefore, it is possible to stably hold the rubber ring 20.

The weight holder 10 is attached to the eccentric cam 7a. The weight holder 10 cooperates with an orbital plate 25 to restrict the movement of the intermediate member 9 in the axial direction (the anteroposterior direction), thereby holding the intermediate member such that the intermediate member cannot fall off in the axial direction. The weight holder 10 is fixed to the eccentric cam 7a by the holder 10 and rotates on the spindle 6 at the same speed as that of the gear 7. At a part of the weight holder 10, a through-hole 10a is formed. The sleeve 21 is held by the pin 11, which is pressed into the through-holes 10a, such that the sleeve 21 passes a predetermined rotational track on the pin 11.

Figure 3:
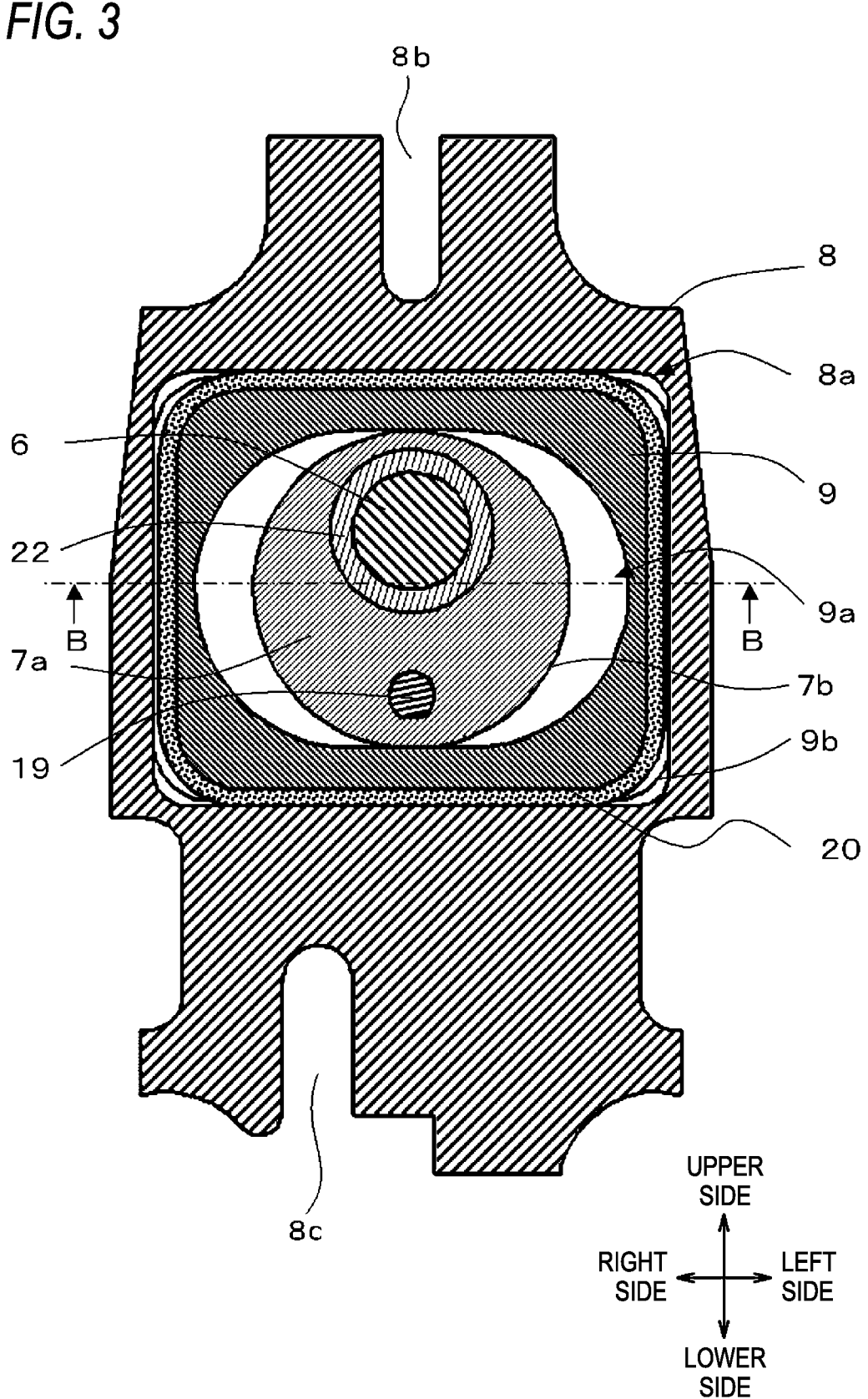
FIG. 3 FIG. 3 is a cross-sectional view illustrating a portion A-A of FIG. 2.

FIG. 3 is a cross-sectional view illustrating a portion A-A of FIG. 2. The shape of the balance weight 8 as seen from the front side can be understood from FIG. 3. At the upper side of the balance weight 8, a guide groove 8b is formed to guide vertical motion of the balance weight 8 while being slidably fit with the guide pin 24 (see FIG. 1) protruding from the gear holder 5. Similarly, at the lower side of the balance weight 8, a guide groove 8c is formed. The guide groove 8c is provided not at the center portion, but on the left side of the center portion in the horizontal direction. Incidentally, like guide groove 8b, the guide groove 8c may be provided at the center portion in the horizontal direction. In the vicinity of the center of the balance weight 8 in the vertical direction, the opening 8a is provided to be substantially quadrangular in a front view. Inside the opening 8a, the intermediate member 9 having the outside diameter corresponding to the internal shape of the opening 8a is disposed. The intermediate member 9 interacts with the eccentric cam 7a, thereby converting the rotation of the eccentric cam 7a into the linear reciprocation of the balance weight 8 in the vertical direction. The intermediate member 9 has an oval interlocking portion 9a formed therein. One revolution of the eccentric cam 7a makes the intermediate member 9 and the balance weight 8 reciprocate once in the vertical direction.

In the present embodiment, the outer periphery of the intermediate member 9 does not come in direct contact with the inner periphery of the opening 8a. The outer periphery of the intermediate member 9 contacts the inner periphery of the opening 8a through the rubber ring 20. In FIG. 3, the size (the position of the outer circumference) of the intermediate member 9 seems to be sufficiently smaller than that of the opening 8a, and gaps seem to be large. This is because the section A-A of FIG. 2 is a section passing the cylindrical recess 9b formed at the outer periphery of the intermediate member 9. The shape of the outer circumference of the intermediate member 9 and the shape of the opening 8a of the balance weight 8 are set such that the substantial distance between the intermediate member 9 and the opening 8a is sufficiently small, the profiles of the outer peripheries of the side wall portions of the recess are positioned as shown by a reference symbol '9b' of FIG. 3, and a gap necessary and sufficient to obtain the elastic action of the rubber ring 20 is obtained. It is preferable to set the groove depth of the recess 9b to an appropriate range, for example, about 1.0 time to 0.8 times with respect to the thickness (diameter) 'a' of the rubber ring 20 according to a material.

The eccentric cam 7a is formed such that the position of the outer periphery 7b is offset from the spindle 6 which is the rotation center, and the eccentric cam 7a eccentrically rotates on the spindle 6. The spindle 6 fixed to the gear holder 5 passes through a part of the eccentric cam 7a with the bearing 22 interposed between the spindle 6 and the eccentric cam 7a such that the eccentric cam 7a as a rotary member can smoothly rotate on the spindle 6 as a fixed member. The bolt 19 for fixing the weight holder 10 (see FIG. 1 and FIG. 4 to be described later) is screwed into the eccentric cam 7a. According to this configuration, the phase of the reciprocation of the balance weight 8 becomes opposite to the phase of the reciprocation of the plunger 12. Therefore, if the eccentric cam 7a eccentrically rotates according to the revolution of the gear 7, the balance weight 8 is guided into the guide grooves 8b and 8c so as to vertically reciprocate in the opposite phase to those of the plunger 12 and the blade 14. As a result, the balance weight 8 compensates for the vibration of the plunger 12 and the blade 14.

In general, between sliding members, in order to make an operation smooth, a minute gap is provided. However, in reciprocating tools, when the reciprocation direction is reversed, components may collide with each other due to the above-described gap, resulting in vibration and noise. In the present embodiment, by disposing the intermediate member 9 and the rubber ring 20 between the balance weight 8 and the eccentric cam 7a, a collision load is buffered by the rubber ring 20, and thus it becomes possible to reduce the vibration and the noise. Further, by configuring the intermediate member 9 and the eccentric cam 7a, both of which are made of metal materials, slide on each other, it is possible to prevent the wearing of the rubber ring 20 and to lengthen the life thereof. Further, by providing the recess 9b, as a portion for restricting the deformation of the elastic member, to the recess 9b, it is possible to prevent damage attributable to excessively large deformation of the rubber ring 20 and to lengthen the life of the rubber ring 20.

Figure 4:
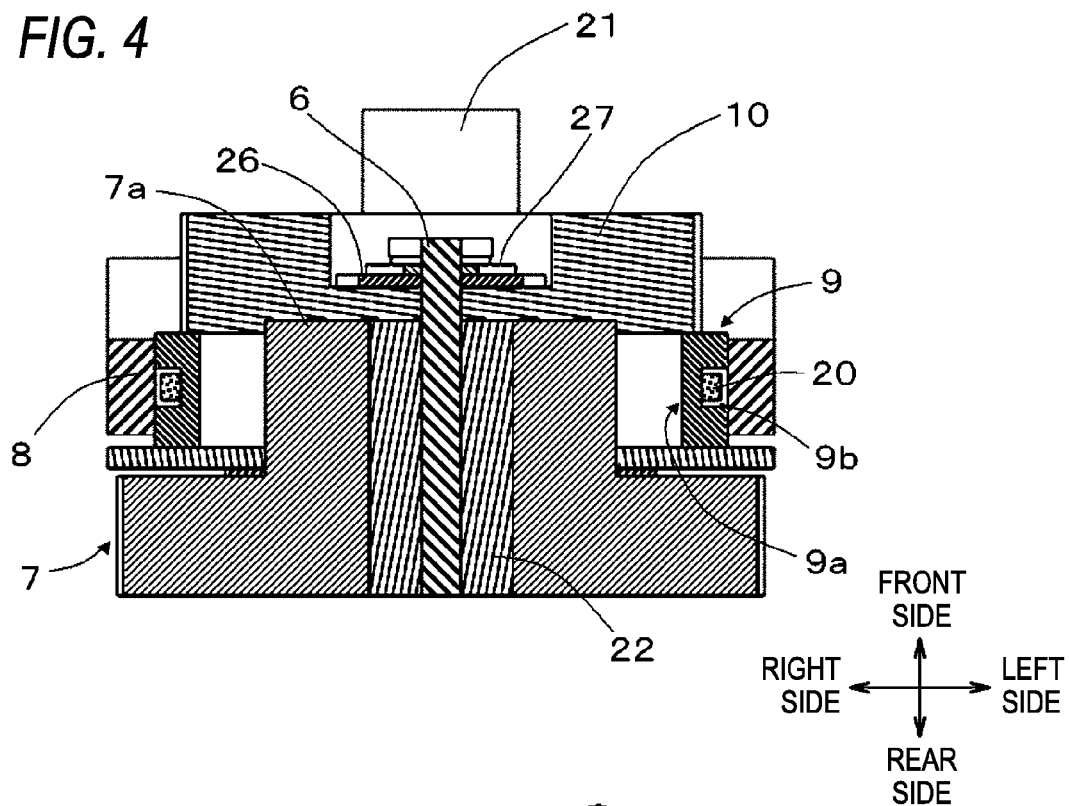
FIG. 4 is a cross-sectional view illustrating a portion B-B of FIG. 3.

FIG. 4 is a cross-sectional view illustrating a portion B-B of FIG. 3. At the front end portion of the spindle 6, a washer 26 for retaining the weight holder 10 is provided. A retaining ring 27 is mounted in a lead pipe groove formed at the spindle 6 such that the washer 26 is prevented from being fallen off to the front side in the axial direction. It is preferable to set the width of the recess 9b of the intermediate member 9 in the axial direction to a size that is larger than the width (or diameter) of the rubber ring 20 so as to form a gap therebetween in the axial direction (the anteroposterior direction). Also, it is preferable to set the depth of the recess 9b in the radial direction (the horizontal direction) to a size that is larger than the width (or diameter) of the rubber ring 20 so as to form a minute gap therebetween in the radial direction (the horizontal direction). According to this configuration, when the intermediate member 9 moves vertically to the balance weight 8, it is possible to suppress the rubber ring 20 from wearing due to rubbing on the balance weight 8. Incidentally, the cross-section of the rubber ring 20 of FIG. 4 is quadrangular. However, the cross-section of the rubber ring 20 may be circular. As described above, since the recess 9b is formed at the intermediate member 9 and the rubber ring 20 is accommodated in the recess 9b, there is no fear that the rubber ring 20 may shift in the axial direction (the anteroposterior direction). Therefore, even if the intermediate member 9 comes into close contact with the balance weight 8 beyond necessity, it is possible to prevent the rubber ring 20 from being damaged. Further, even if the intermediate member 9 comes into close contact with the balance weight 8, the impact is sufficiently buffered by the rubber ring 20 as the elastic member. Therefore, it is possible to significantly reduce the occurrence of collision sound or vibration.

Second Embodiment

Figure 5:
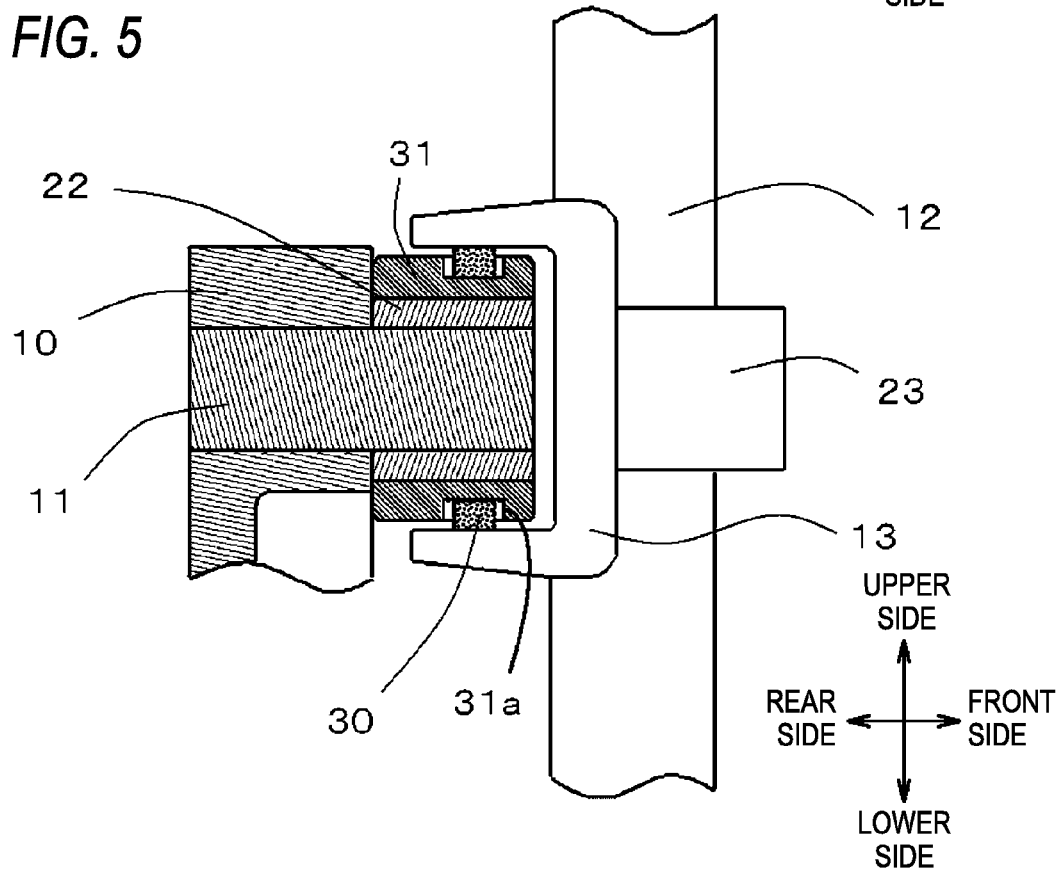
FIG. 5 is an enlarged cross-sectional view illustrating main parts in a state where a sleeve 21 and a connector 13 of a reciprocating tool according to a second embodiment of the present invention.

Next, a second embodiment of the present invention will be described with reference to FIG. 5. FIG. 5 is an enlarged cross-sectional view illustrating main parts in a state where the connector 13 and a sleeve 31 of FIG. 5 are connected to each other. Identical portions to those of the first embodiment are denoted by the same reference symbols, and different portions will be mainly described. The pin 11 is fixed to the weight holder 10 that is screwed to the eccentric cam 7a. The pin 11 does not rotate relatively to the weight holder 10. However, according to the rotation of the weight holder 10, the pin 11 moves such that the rotation track of the pin 11 is offset from the spindle 6 as seen from the front side. That is, the pin 11 may configure one example of the eccentric rotation member. On the outer circumference of the pin 11, the sleeve 31 as an intermediate member is disposed through the bearing 22. The sleeve 31 is fixed to the plunger 12 forming a part of a reciprocating member, and is disposed so as to be slidably fit with connector 13. The connector 13 is a rail member having a predetermined length in the transverse direction and having a U-shaped cross-section. The plunger 12 is fixed to the front side of the connector 13 through the holder 23. In the present embodiment, between the sleeve 31 and the plunger 12, specifically, between the sleeve 31 and the connector 13, a rubber ring 30 is disposed as the elastic member, such that the sleeve 31 cannot come into direct contact with the inner periphery (the upper wall portion and lower wall portion) of the connector 13. Therefore, it is possible to reduce vibration and noise attributable to the reciprocation of the plunger 12 and the blade 14.

Also in the second embodiment, like in the first embodiment, a recess, e.g., a concave groove 31a is formed at the outer periphery of the sleeve 31 to continue in the circumferential direction, and the rubber ring 30 is disposed in the groove 31a. From the sizes of the groove 31a and the rubber ring 30 shown in FIG. 5, it can be seen that the depth (width in the radial direction) of the groove 31a is smaller than the thickness of the rubber ring 30 in the radial direction. Also, it can be seen that the width (width in the axial direction) of the groove 31a is larger than the thickness of the rubber ring 30 in the axial direction. Therefore, if a strong force is applied to the connector 13 and the sleeve 31 such that the gap therebetween narrows, the rubber ring 30 is not compressed beyond the depth (vertical distance) of the groove 31a. That is, the groove 31a may configure one example of the deformation restricting portion. Therefore, it is possible to effectively prevent a reduction in the life of the rubber ring 30. This configuration can be implemented only by replacing the sleeve 21 (see FIG. 1) of the first embodiment with the sleeve 31 and the rubber ring 30 shown in FIG. 5, and thus can be easily realized without a large increase in the number of components or the cost.

As described above, in the second embodiment, the rubber ring 30 is disposed between the plunger 12 (the connector 13) and the sleeve 31. Therefore, it is possible to significantly reduce vibration and noise occurring in the vicinity of this sliding portion. Incidentally, the second embodiment and the first embodiment may be applied at the same time. Alternatively, only any one of the first and second embodiments may be separately carried out.

Third Embodiment

Figure 6:
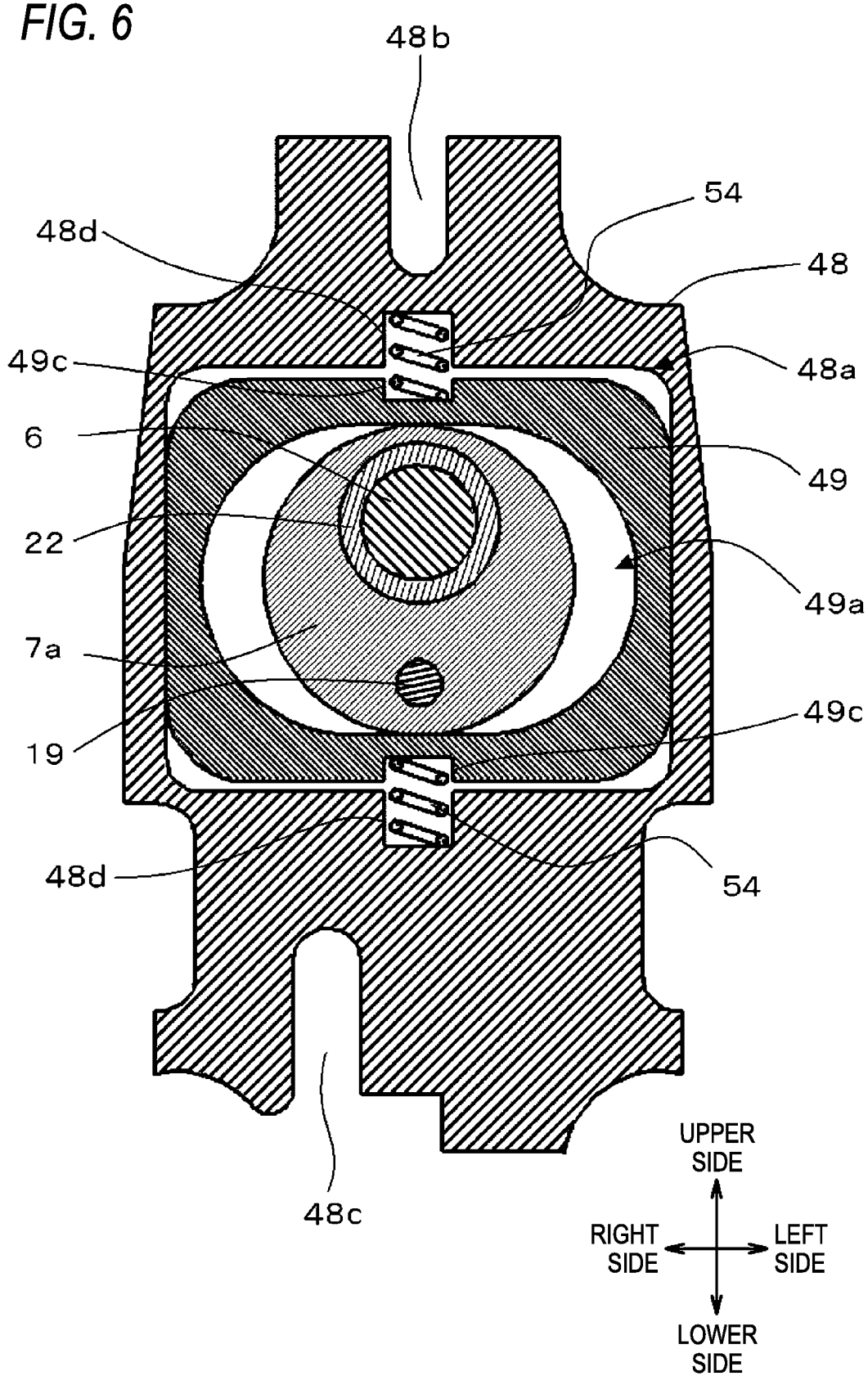
FIG. 6 is an enlarged cross-sectional view illustrating main parts in a vicinity of a balance weight 48 of a reciprocating tool according to a third embodiment of the present invention.
Figure 7:
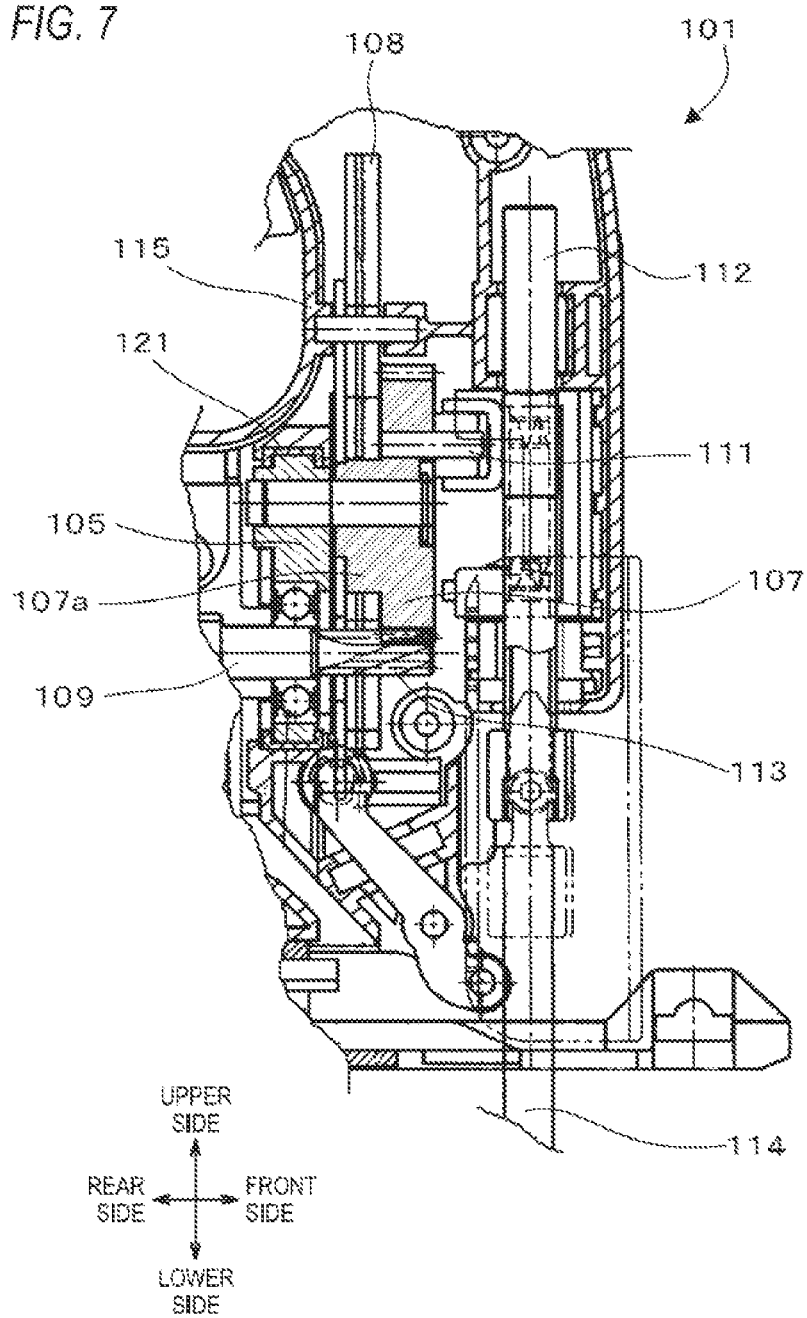
FIG. 7 is a cross-sectional view illustrating a structure of a main part of a related-art reciprocating tool.

Next, a third embodiment of the present invention will be described with reference to FIG. 6. FIG. 6 is an enlarged cross-sectional view illustrating main parts in the vicinity of a balance weight 48 of a reciprocating tool according to a third embodiment of the present invention. Portions using identical components to those of the first embodiment are denoted by the same reference symbols, and different portions will be mainly described.

In the first embodiment, as the elastic member, the rubber ring 20 is used. However, the elastic member can be implemented by not only various rubber materials but also other elastic means and elastic members. In an example shown in FIG. 6, as the elastic means, coil springs 54 are used. The coil springs 54 are compressed spring obtained by spirally winding a thin metal wire and press an intermediate member 49 and a balance weight 48 such that they move away from each other. The shape of the whole of the balance weight 48 is substantially the same as that the balance weight 8 shown in FIG. 3 (so that the balance weight 48 includes the guide grooves 48b, 48c as shown in FIG. 6) except that cylindrical grooves 48d for accommodating the coil springs 54 are formed. Since FIG. 6 is a cross-sectional view at a position corresponding to the portion A-A of FIG. 2, in FIG. 6, the grooves 48d seem to be quadrangular or rectangular. However, the grooves 48d are cylindrical grooves extending upward or downward from an opening 48a. Similarly, at the outer periphery of the intermediate member 49, grooves 49c are formed at positions corresponding to the grooves 48d. The grooves 49c may also be cylindrical grooves extending upward or downward. Between the grooves 48d and 49c facing each other, the coil springs 54 are disposed. Since both end portions of each coil spring 54 are accommodated in the internal spaces of the corresponding cylindrical grooves 48d and 48c, the coil springs 54 are stably held without shifting in the anteroposterior direction and the horizontal direction.

An eccentric cam 7a, the spindle 6, and the like disposed inside the interlocking portion 49a of the intermediate member 49 are identical to components described in the first embodiment. In this configuration, by designing the spring constants of the coil springs 54 appropriately, it is possible to reduce noise and vibration attributable to the collision of the intermediate member 49 and the balance weight 48. In the present embodiment, total two coil springs 54 are used on the upper side and lower side of the intermediate member, respectively. However, the number of coil springs 54 is not limited thereto. One or more coil springs 54 may be provided on each side of the upper portion and the lower portion. It may be less necessary to design the coil springs 54 at the left and right outer circumference portions of the intermediate member in view of the reciprocation direction of the balance weight 48; however, such configuration is not excluded. In the present embodiment, the coil springs 54 disposed between the intermediate member 49 and the balance weight 48 are used as the elastic members. However, even if other elastic members such as flat springs and disc springs are used, it may be possible to achieve the same effects. Therefore, it is preferable to select appropriate springs according to product specifications.

Also in the third embodiment, the elastic members (the coil springs 54) are provided between the eccentric cam 7a as an eccentric rotation member and a power transmission path to the balance weight 48 as a reciprocating member. Therefore, it is possible to reduce vibration or noise attributable to contact with the eccentric rotation member when the movement direction of the reciprocating member is reversed.

Although the present invention has been described on the basis of the embodiments, the present invention is not limited by the above-described embodiments, but may be variously changed without departing from the scope of the present invention. For example, in the above-described embodiments, as the elastic member, the rubber ring 20 is provided to the outer circumference portion of the intermediate member 9. However, the elastic member is not limited to a ring-shaped member such as an O ring. Band-like rubber members or other elastic members may be provided to the upper and lower edge portions of the intermediate member 9. Further, in the above-described embodiments, as the deformation restricting portion, the recess 9b is provided to the intermediate member. However, the shapes of the cross-sections (cross-sections in the anteroposterior direction) of facing portions of the intermediate member and the balance weight may be set to L shapes, vertically protruding portions of them may be disposed as described above (e.g., disposed such that one side becomes a shape obtained by rotating the L shape 90 degrees, and the other becomes a shape obtained by rotating the L shape 270 degrees) so as to face each other, and an elastic member may be inserted into a space formed between the facing portions. Although the above-described embodiments have been described by using a jigsaw as an example of the reciprocating tool, the present invention can be applied to other reciprocating tools such as saver saws.

This application claims the benefit of Japanese Patent Application No. 2011-201552 filed on Sep. 15, 2011, the disclosure of which is incorporated herein in its entirety by reference.

INDUSTRIAL APPLICABILITY

As described above, a reciprocating tool according to the invention has advantages of capable of reducing noise by a simple and inexpensive configuration. The invention is useful for the reciprocating tool, for example.

REFERENCE SIGNS LIST

1 Reciprocating Tool
2 Motor
2a Output Shaft
3 Housing
4 Pinion
5 Gear Holder
6 Spindle
7 Gear
7a Eccentric Cam
7b Outer Periphery
8 Balance Weight
8a Opening
8b, 8c Guide Groove
9 Intermediate Member
9a Interlocking Portion
9b Recess
10 Weight Holder 10a Through-Hole
11 Pin
12 Plunger
13 Connector
14 Blade
15 Base
15a Opening
16 Handle Portion
17 Trigger Switch
18 Power Supply Cord
19 Bolt
20 Rubber Ring
21 Sleeve
22 Bearing
23 Holder
24 Guide Pin
25 Orbital Plate
26 Washer
27 Retaining Ring
30 Rubber Ring
31 Sleeve
31a Groove
48 Balance Weight
48a Opening
48b, 48c Guide Groove
48d Groove
49 Intermediate Member
49a Interlocking Portion
49c Groove
54 Coil Spring
101 Jigsaw
105 Gear Holder
107 Gear
107a Eccentric Cam
108 Balance Weight
109 Output Shaft
111 Eccentric Pin
112 Plunger
113 Pinion
114 Blade
115 Housing
121 Elastic Member

The invention claimed is:

1. A reciprocating tool comprising:
a rotary drive source; and
a reciprocating motion converter configured to convert a rotation of the rotary drive source into a reciprocation of a tip tool, wherein:
the reciprocating motion converter comprises:
a cam configured to eccentrically rotate;
a balance weight, which is engaged with an elastic member, and which is configured to reciprocate; and
an intermediate member which is disposed between the cam and the balance weight, and which is engaged with the cam and the balance weight,
wherein the elastic member is provided between the intermediate member and the balance weight and is engaged with the intermediate member and the balance weight.

2. The reciprocating tool according to claim 1, wherein a recess for preventing excessively large deformation of the elastic member is provided to at least one of the intermediate member and the balance weight.

3. The reciprocating tool according to claim 2, wherein:
the elastic member is a rubber member;
the recess is formed at any one of facing surfaces of the intermediate member and the balance weight; and
the elastic member is disposed in the recess.

4. The reciprocating tool according to claim 1, wherein the elastic member has elasticity in a movement direction of the balance weight.

5. The reciprocating tool according to claim 4, wherein:
an outer periphery of the cam has a circular shape, and the cam has a rotary shaft at a position offset from a center of the circular shape;
the balance weight has an opening and is configured to move in a direction perpendicular to the direction of the rotary shaft of the cam;
the intermediate member has an opening and is disposed in the opening of the balance weight; and
the eccentric cam is configured to rotate while coming into contact with the inner portion of the opening of the intermediate member, so as to reciprocate the balance weight.

6. The reciprocating tool comprising:
a rotary drive source; and
a reciprocating motion converter configured to convert a rotation of the rotary drive source into a reciprocation of a tip tool, wherein:
the reciprocating motion converter comprises:
a pin configured to eccentrically rotate;
a plunger which comprises a connector which is engaged with a holder through the connector, and which is configured to reciprocate;
an intermediate member, which is disposed between the pin and the plunger, and which is rotatably supported by the pin that is at a position offset from an output shaft of the rotation of the drive source; and
an elastic member provided between the intermediate member and the plunger, and which is engaged with the intermediate member and the connector.

7. The reciprocating tool according to claim 6, wherein:
the intermediate member is a sleeve;
the sleeve is pivotally supported by the pin; and
the plunger is reciprocally supported by the sleeve and is configured to fix the tip tool.

8. The reciprocating tool according to claim 7, wherein:
the elastic member is provided between the sleeve and the connector.

9. The reciprocating tool according to claim 8, wherein:
the elastic member is an O ring made of rubber; and
the O ring is provided in a recess formed at a surface which is an outer periphery of the sleeve and is slidably fit with the connector.

* * * * *